United States Patent Office 2,854,498
Patented Sept. 30, 1958

2,854,498

ZIRCONIUM HALIDE-ALKYL ESTER OF PHOSPHORUS ACID CATALYSTS AND USE THEREOF

Wilford J. Zimmerschied, Crown Point, Ind., and Paul N. Rylander, Chicago, Ill., assignors to Standard Oil Company, Chicago, Ill., a corporation of Indiana No Drawing. Application December 29, 1955
Serial No. 556,065

13 Claims. (Cl. 260—683.15)

The present invention relates to novel catalysts, to processes for their manufacture and to their utilization, particularly in processes for the conversion of hydrocarbons. In one aspect, our invention relates to a process for the manufacture of solid materials which are active in acid-type catalysis, e. g. conversions of normally gaseous olefins such as ethylene, propylene, butenes, or their mixtures.

One object of our invention is to provide new solid, complex, acidic catalysts derived from interaction of certain halides of zirconium and certain esters of phosphorus acids. Another object is to provide new processes for the manufacture of said solid catalysts. Yet another object of our invention is to provide new and advantageous catalysts for the various processes in which acid-type catalysts such as HF, $H_2SO_4$, liquid or "dry" acids of phosphorous and acidic silica-alumina compositions have heretofore been employed. An additional object is to provide novel catalytic conversions employing the catalysts of the present invention. These and other objects of our invention will become apparent from the ensuing description thereof.

In co-pending application Serial Number 375,808 of C. E. Johnson and W. J. Zimmerschied there is described a method for the manufacture of acid-type catalysts by the reaction of halides of titanium with esters of phosphorus acids at temperatures up to about 300° C. We have found that reaction of halides of zirconium with esters of phosphorus acids under the reaction conditions therein described leads to formation of solid materials which are catalytically inactive in the conversion of hydrocarbons. We have further found that solid, complex, non-stoichiometric, zirconium-based catalysts having high activity in the conversion of hydrocarbons may be prepared by reaction of zirconium halides with esters of certain acids of phosphorous and, further, that it is essential to calcine the reaction mixture at an elevated temperature of from about 450° to about 500° C. for a period of time sufficient to substantially remove carbonaceous residues contained in the catalyst.

Briefly, our catalysts are prepared by heating a mixture of a zirconium halide with a lower alkyl ester of an acid of phosphorus selected from the group consisting of orthophosphoric acid and triphosphoric acid, said alkyl groups containing preferably not more than 6 carbon atoms. The molar ratio of halogen, as halide, to the alkyl group in the reaction mixture may be varied within the range of about 0.3 to about 0.75. Under the conditions of heating a reaction occurs to produce alkyl halide, the alkyl group being derived from said ester and the halogen from the zirconium halide, together with a solid material containing zirconium and phosphorous. The reaction mixture is heated at a temperature sufficient to cause a steady but controllable evolution of alkyl halide from the reaction mixture, viz. between about 75° C. and 300° C. The heating of the reaction mixture is continued until evolution of alkyl halide has substantially ceased, and the temperature then elevated to effect calcination of the solid residue at temperatures between about 400° C. and about 600° C., preferably between about 450° C. and 500° C. Calcination is effected in air and is continued for from about 1 to about 4 hours until the catalyst becomes white, indicating that the carbon has been burned off. The solid catalysts prepared in the manner described above are active for acid-catalyzed reactions of organic compounds. A significant feature of our new catalysts is that they require no added or external solid supporting materials.

The preferred halide of zirconium employed in our process is zirconium tetrachloride. We may, however, employ other halides of zirconium for the purpose of preparing acid-active catalysts, for example, $ZrCl_3$, $ZrCl_2$, $ZrF_3$, $ZrF_4$, $ZrBr_2$, $ZrBr_4$ and $ZrI_4$. In addition, the mixed halides or oxyhalides of zirconium for example, $ZrOCl_2$, $ZrOBr_2$, and the like may be employed.

The alkyl groups of the esters may be n-propyl, isopropyl, n-butyl, isobutyl, t-butyl, n-amyl, isoamyl, n-hexyl and the like. Various t-alkyl phosphates may be employed, but because they are somewhat more difficult to prepare than the corresponding n-alkyl and isoalkyl phosphates, their use in the present invention is not preferred. We prefer to employ esters of phosphorus acids in which the alkyl groups contain not more than 6 carbon atoms, but esters of higher molecular weight may be employed, for example, having up to about 12 to 15 carbon atoms per alkyl group. When an ester of higher molecular weight is so employed, it may be necessary to apply a vacuum during the reaction period to facilitate more complete removal of the higher-boiling alkyl halide formed during the reaction. In such a case, the final calcination of the catalyst is effected in air so as to burn off the carbon and obtain an active catalyst. In general, we prefer to employ the fully esterified phosphorus acids, for example, ethyl ortho-phosphate.

Our new catalysts may be promoted, if desired, by addition thereto of a small proportion (for example, 0.1 to 5 percent by weight) of a hydrogen halide such as hydrogen chloride or hydrogen bromide, or of a Friedel-Crafts halide, such as aluminum chloride or $TiCl_4$, before or during use in catalytic reactions.

The catalyst is conveniently employed as a powder, slurried in the charging stock, or as solid particles, pellets, or pills, in a fixed or moving bed. Numerous alternative processes and reactor designs will be apparent to those skilled in art.

The following specific examples are intended to be merely illustrative and not to limit the broad scope of our invention.

Example 1

Into a 3-necked, 300 ml. flask equipped with stirrer, dropping funnel and short column arranged for downward distillation of ethyl chloride as formed, were placed 50.4 grams (.216 mol) of $ZrCl_4$. To this 91 grams of $(EtO)_3PO$ (corresponding to 0.576 chlorine atom per ethyl group) were added slowly from the dropping funnel. A vigorous reaction occurred as the ethyl phosphate was added. After the addition was completed the temperature was raised to 240° C. resulting in formation and distillation of ethyl chloride from the reaction mixture; after one hour, evolution of the volatile material had substantially ceased. The solid residue was not calcined.

(A) The solid uncalcined residue so formed (5.0 grams) was charged with 56 grams of propylene to a stainless steel reactor provided with a magnetically-actuated stirrer. After heating for 2 hours at 200° C. under autogenous pressure essentially all of the propylene charged was recovered unchanged, proving that this solid residue was inactive for propylene polymerization.

(B) A portion of the black, porous catalyst prepared as above was placed in a muffle furnace and heated in air for 4 hours at 450–500° C. until it became white, indicating that the carbonaceous components thereof had been burned off. It is also probable that some oxidation of the inorganic components of the catalyst occurred. The calcined catalyst (5.0 grams) was charged with 56 grams of propylene to a stainless steel, stirred autoclave and heated for two hours at 200° C. There was obtained 35 grams of liquid polymer, $n_D^{20}$ 1.4270, corresponding to 62.5% conversion of the propylene charged.

*Example 2*

Into a 500 ml. 3-necked flask fitted with a stirrer, dropping funnel and short column arranged for the downward distillation of butyl chloride as it was formed, were placed 35 g. (0.15 mole) of $ZrCl_4$. To this was added 125 g. (0.5 mole) of $(C_4H_9O)_3PO$ from a dropping funnel (corresponds to 0.40 chlorine atoms per butyl group). After the addition was completed, the temperature was raised to 100° C. Some butyl chloride distilled off. The temperature was gradually raised to 240° C. A total of 78 g. of butyl chloride was distilled off.

(A) Into a 250 ml. stirred autoclave were charged 5 g. of the uncalcined catalyst with 65 g. of propylene. The reactor was heated to 200° C. for 2 hours. A total weight of 2 g. of polymer (corresponding to 3% conversion) was obtained.

(B) Part of the catalyst was calcined to 475° C. for about 3 hours. Into a stirred autoclave were charged 5 g. of the calcined catalyst with 65 g. of propylene. The reactor was heated to 200° C. for 2 hours. Yield of polymer was 36 g. (corresponding to a 56% conversion). Polymer had refractive index of 1.4273.

*Example 3*

Into a 250 ml. stainless steel reactor provided with a magnetically-actuated stirrer were placed 5 g. of catalyst (part of the calcined catalyst prepared in Example 2B), 63 g. of benzene and 27 g. of propylene. The mixture was heated with stirring for 3 hours at 200° C.

The liquid product weighed 80 g. and had a refractive index of $n_D^{20}$ 1.4870. Upon distillation, in addition to benzene and a residue of 9 g., a fraction weighing 30 g. and having a boiling range of 147°–154° C. at atmospheric pressure was recovered. This fraction had a refractive index of $n_D^{20}$ 1.4852, and comprised primarily cumene contaminated with a small amount of polypropylene which could be removed by washing with sulfuric acid. The distillation residue probably comprised polyalkyated benzenes.

Our new catalysts are useful in a wide variety of hydrocarbon-conversion reactions, generally at temperatures between about 150° C. and about 550° C. Thus our novel catalysts can be used for the polymerization of $C_3$ and higher olefins and of other unsaturated hydrocarbons at around 150° to 300° C. to form liquids or oils of higher molecular weight; the alkylation of aromatic hydrocarbons, phenols, heterocyclics or isoparaffins with olefins or olefin-affording substances or with diolefins; the isomerization of paraffins or naphthenes; the isomerization of alkylbenzenes such as xylenes, trimethylbenzenes, higher-alkyl xylenes, and the like; the desulfurization or hydrodesulfurization of petroleum fractions containing organic sulfur compounds, such as West Texas virgin heavy naphtha, coke still naphtha, and the like; the side-chain dehydrogenation of alkyl aromatics such as isopropylbenzene to form α-methylstyrene, and the like; the treatment of motor fuels to increase their antiknock rating; cracking of petroleum fractions, and the like. The Zr-P catalyst, with or without added oxides of transition metals of periodic groups 5 and 6, may be employed with hydrogen pressures between about 200 and about 1000 or 1500 p. s. i. at temperatures between about 200° C. and about 500° C. for the hydrodesulfurization of sulfur-containing petroleum fractions such as naphthas or gas oils at liquid hourly space velocities between about 0.5 and about 4.

The catalyst produced by the present invention may also be employed for the interaction of olefins with hydrogen sulfide to produce mercaptans; the interaction of olefins, carbon monoxide and steam to produce carboxylic acids; isomerization of olefins, e. g. 1-butene to 2-butene; the polymerization of olefin oxides; the interaction of alcohols or mercaptans with olefin oxides to produce alkoxy derivatives thereof; the dehydration of alcohols to produce olefins and ethers; the dehydration of 1,3-butylene glycol to produce butadiene; the reactions of olefins with carboxylic acids to form esters, etc.

It frequently happens that in the course of various conversions carried out in the presence of our catalysts, particularly in conversions of hydrocarbons such as the polymerization of olefins at high temperatures, hydrogen-deficient carbonaceous or coke-like residues accumulate upon the catalyst and reduce its catalytic efficiency. The present catalysts may readily be regenerated by treatment with hydrogen or oxygen as above described. As a preliminary to the regeneration of partially spent catalyst with hydrogen or oxygen, it may be desirable to extract the catalyst with a hydrocarbon solvent such as benzene, pentane, hexane, etc., usually at temperatures between about 50 to about 200° C. under pressure sufficient to maintain the extractant in the liquid phase in order to remove extractable hydrocarbon residues from the catalyst, thereby facilitating the subsequent regeneration treatment with hydrogen or oxygen.

Having thus described our invention, what we claim is:

1. A process for the preparation of a solid material suitable for catalyzing the polymerization of propylene which process comprises mixing a halide of zirconium selected from the group consisting of zirconium fluorides, chlorides and bromides with an alkyl ester of an acid selected from the group consisting of orthophosphoric and triphosphoric acids, the molar ratio of halogen as halide in said reaction mixture to alkyl groups being between about 0.35 and about 0.75, heating said mixture to between about 150° C. and about 300° C. thereby to effect substantial evolution of alkyl halide from said reaction mixture and calcining the resultant product at from about 400° C. to about 600° C. for a period sufficient to substantially remove all of the carbon from the calcined product, and recovering the solid catalytic material thus produced.

2. The process of claim 1 wherein said alkyl ester contains not more than 6 carbon atoms per alkyl group.

3. A process for the preparation of a solid material suitable for catalyzing the polymerization of propylene which process comprises mixing zirconium tetrachloride with a lower alkyl ester containing not more than 6 carbon atoms per alkyl group of orthophosphoric acid, the molar ratio of chloride to alkyl groups in said reaction mixture being between about 0.35 to about 0.75, heating said mixture to between about 150° C. and about 300° C. to remove substantially all of the alkyl halide from the reaction mixture and calcining the resultant product at from about 400° to about 600° C. for a period sufficient to substantially remove all carbon from the calcined product and recovering the catalyst so formed.

4. The process of claim 3 wherein the temperature of calcination lies between about 450° C. and about 500° C.

5. The process of claim 4 wherein said alkyl ester of orthophosphoric acid is an n-alkyl orthophosphate.

6. The process of claim 5 wherein said alkyl ester of orthophosphoric acid is ethyl orthophosphate.

7. A process for the conversion of a normally gaseous olefin which comprises contacting said olefin under conversion conditions of temperature and pressure with a catalyst prepared by the process of claim 1.

8. A process for the polymerization of a normally gaseous olefin which comprises contacting said olefin under polymerization conditions of temperature and pressure with a catalyst prepared by the process of claim 1.

9. A process for the polymerization of propylene which comprises contacting propylene at a temperature between about 150° C. and about 300° C. with the catalyst produced by the process of claim 1.

10. A process for the polymerization of propylene which comprises contacting propylene at a temperature between about 150° C. and about 300° C. with the catalyst produced by the process of claim 3.

11. A process for the alkylation of a normally gaseous olefin which process comprises contacting said olefin and an olefin-alkylatable compound with the catalyst produced by the process of claim 1 under alkylating conditions.

12. The process of claim 11 wherein said olefin is propylene and said olefin-alkylatable compound is an aromatic hydrocarbon.

13. The process of claim 11 wherein said olefin is propylene and said olefin-alkylatable compound is benzene.

References Cited in the file of this patent

UNITED STATES PATENTS

| | | |
|---|---|---|
| 2,349,243 | Bates | May 23, 1944 |
| 2,614,136 | Kolfenbach et al. | Oct. 14, 1952 |
| 2,650,201 | Mavity | Aug. 25, 1953 |
| 2,727,010 | Zimmerschied | Dec. 13, 1955 |

UNITED STATES PATENT OFFICE
CERTIFICATE OF CORRECTION

Patent No. 2,854,498                       September 30, 1958

Wilford J. Zimmerschied et al.

It is hereby certified that error appears in the printed specification of the above numbered patent requiring correction and that the said Letters Patent should read as corrected below.

Column 3, line 50, Example 3, for the numeral "1.4852" read -- 1.4862 --.

Signed and sealed this 16th day of December 1958.

(SEAL)
Attest:

KARL H. AXLINE
Attesting Officer

ROBERT C. WATSON
Commissioner of Patents